United States Patent
Arambel et al.

(10) Patent No.: US 9,355,463 B1
(45) Date of Patent: May 31, 2016

(54) METHOD AND SYSTEM FOR PROCESSING A SEQUENCE OF IMAGES TO IDENTIFY, TRACK, AND/OR TARGET AN OBJECT ON A BODY OF WATER

(71) Applicant: Raytheon Compay, Waltham, MA (US)

(72) Inventors: Pablo Arambel, Woburn, MA (US); Arthur M. Newman, Sherman Oaks, CA (US); Mario Martinez, Corona, CA (US)

(73) Assignee: Raytheon Company, Waltham, MA (US)

( * ) Notice: Subject to any disclaimer, the term of this patent is extended or adjusted under 35 U.S.C. 154(b) by 8 days.

(21) Appl. No.: 14/551,860

(22) Filed: Nov. 24, 2014

(51) Int. Cl.
| G06K 9/00 | (2006.01) |
| G06T 7/20 | (2006.01) |
| G06K 9/62 | (2006.01) |

(52) U.S. Cl.
CPC ............ G06T 7/204 (2013.01); G06K 9/0063 (2013.01); G06K 9/628 (2013.01); G06T 7/2006 (2013.01); G06T 2207/10016 (2013.01); G06T 2207/10032 (2013.01); G06T 2207/20021 (2013.01); G06T 2207/20076 (2013.01); G06T 2207/30241 (2013.01)

(58) Field of Classification Search
CPC combination set(s) only.
See application file for complete search history.

(56) References Cited

U.S. PATENT DOCUMENTS

| 5,787,048 A  * | 7/1998 | Sanford ................. B63G 13/02 367/1 |
| 5,805,101 A  * | 9/1998 | Bodenmueller ........ G01S 7/411 342/21 |
| 7,085,426 B2 * | 8/2006 | August .................... G06K 9/40 348/533 |
| 8,116,522 B1 * | 2/2012 | Buck ..................... G06K 9/0063 382/103 |
| 8,170,282 B1 * | 5/2012 | Roskovensky ....... G06K 9/0063 367/118 |
| 8,534,214 B1 * | 9/2013 | Gasper ................... B63B 35/85 114/284 |
| 8,538,082 B2 | 9/2013 | Zhao et al. |
| 8,553,933 B2 | 10/2013 | Newman et al. |
| 2007/0159922 A1* | 7/2007 | Zimmerman ....... G01S 7/52004 367/103 |
| 2008/0147257 A1* | 6/2008 | Kuhlgatz ................ B63B 49/00 701/21 |
| 2014/0022860 A1* | 1/2014 | Van Borselen ......... G01V 1/364 367/24 |

OTHER PUBLICATIONS

Haarst et al., "Automatic Detection in a Maritime Environment: Gradient Filter Versus Intensity Background Estimation," Proceeding of SPIE Defence and Security Conference, Orlando, 2008.
Hartemink, "Robust Automatic Object Detection iin a Maritime Environment,", MS Thesis, 2012.

(Continued)

Primary Examiner — Anand Bhatnagar
(74) Attorney, Agent, or Firm — Burns & Levinson LLP; Joseph M. Maraia

(57) ABSTRACT

Airborne tracking systems use sensors to track objects of interest. In order to track the objects of interests, the sensors need to be steered such that the object is kept, ideally, in the center of the sensors field of view. Automatic steering of optical sensors requires the generation of a track on an object of interest. When tracking boats on the water, current approaches to image processing may generate multiple detections on the object of interest. Embodiments of the present disclosure solve the track multiplicity problem by grouping tracks associated with the object of interest into a cluster and by estimating a most likely location of the object within the cluster of tracks. Based on the estimated location, embodiments of the present disclosure outputs a single track for the object. The single track is used by an automatic steering system to maintain a sensor aimed at the object of interest.

12 Claims, 8 Drawing Sheets

(56) References Cited

OTHER PUBLICATIONS

Smith et al., "The Statistical Characterization of the Sear for the Segmentation of Maritime Images", 4th EURASIP Conference focused on Video/Image Processing and Multimedia Communications, vol. 2, pp. 489-494, 2003.
Albrecht, T. et al., "Vision-based Attention in Maritime Environments," International Conference on Information, Communication and Signal Processing (ICICS), pp. 1-5, 2011.
Qi, Baojun et al., "Clutter-adaptive Detection of Small Surface Objects in Maritime Surveillance-videos via Shared Features Integration," Optical Engineering, 51(9), Sep. 13, 2012.
Duncan et al., "Detection and Tracking of Moving Objexts in a Maritime Environment using Level Set with Shape Priors," EURASIP Journal on Image and Video Processing, 2013.
Westall et al., "Evaluation of Machine Vision Techniques for Aerial Search of Humans in Maritime Environments," Digital Image Computing: Techniques and Applications (DICTA) 2008, Canberra, Dec. 1-3, 2008, pp. 176-183.
Bao et al., "Context Modeling Combined with Motion Analysis for Moving Ship Detection in Port Surveillance," Journal of Electronic Imaging. 22(4), Aug. 30, 2013.
Shicheng et al., "Multi-directional Infrared Imaging Characterization of Ship Kelvin Wake," 2012 International Conference on Industrial Control and Electronics Engineering (ICICEE), pp. 144-146, 2012.

\* cited by examiner

METHOD AND SYSTEM FOR PROCESSING A SEQUENCE OF IMAGES TO IDENTIFY, TRACK, AND/OR TARGET AN OBJECT ON A BODY OF WATER

BACKGROUND

Airborne tracking systems use sensors (e.g., optical sensors) to track objects of interest. In order to track the objects of interests, the sensors need to be steered such that the object is kept, ideally, in the center of the sensors field of view. Automatic steering of optical sensors requires the generation of a track on the object of interest. A track is a reference in a sequence of images that indicates the location of the object in each image. A steering algorithm continuously steers the sensor so that the object is kept in the center of the sensor's field of view. Prior art methods of tracking objects often generate multiple detections on the object of interest and cause track multiplicity (i.e., multiple tracks that are identified as possibly being associated with the same object of interest). Current systems assume that each track is associated with a distinct object of interest. Track multiplicity affects the steering of the sensors because the tracking system cannot be steered to multiple tracks simultaneously. This often leads the tracking system to lose a correct reference to the object of interest.

SUMMARY

Embodiments of the present disclosure include methods, systems, and computer-readable medium, with program codes embodied thereon, for processing a sequence of images.

One embodiment is a method, executed by one or more processors, that includes identifying at least one detection in an image of a series of images. In this embodiment, each detection is at least one of: an object on a body of water or at least a portion of a wake generated by the object on the body of water. The method also includes associating the at least one detection with a single track of a set of tracks, the set of tracks being stored in a memory. In addition, the method includes creating at least one new track for each of the at least one detection that does not associate with any track of the set of tracks. The method further includes classifying each pixel in the image of the series of images as either an object class or a water class based on a range of pixel values. For each pixel classified as an object class, the method includes grouping each pixel in the image of the series of images into at least one boat-wake cluster, wherein each boat-wake cluster includes pixels belonging to the object class that are adjacent to each other. The method includes associating each of the at least one boat-wake cluster with a subject track of the set of tracks and clustering tracks of the set of tracks that are associated with a common boat-wake cluster. Also, the method includes assigning each cluster of tracks a unique global track identifier and selecting a representative track of each cluster of tracks having a same unique global track identifier. In this embodiment, the selected representative track is a first track in a ranked list of tracks, wherein a rank of a track is based on features that are indicative of a real object.

The method can also include propagating tracks of a set of tracks from one image to the next, wherein each track is possibly an object on a body of water or part of the wake generated by an object on a body of water.

In another embodiment, associating the at least one detection with a single track of a set of tracks includes associating new detections to propagated tracks based on bounding box overlap, so that at most one detection is associated to one track, and at most one track is associated to one detection.

A bounding box can be a reference to the at least one detection. In particular, the bounding box is defined by top and bottom rows and left and right columns of a region that contains at least all pixels that are deemed to belong to the at least one detection.

Another embodiment is a system for processing a sequence of images, the system includes one or more processors in communication with a data storage device. The one or more processors configured to: identify at least one detection in an image of a series of images, wherein each detection is at least one of: an object on a body of water or at least a portion of a wake generated by the object on the body of water; associate the at least one detection with a single track of a set of tracks, the set of tracks being stored in a memory; create at least one new track for each of the at least one detection that does not associate with any track of the set of tracks; classify each pixel in the image of the series of images as either an object class or a water class based on a range of pixel values; for each pixel classified as an object class, group each pixel in the image of the series of images into at least one boat-wake cluster, wherein each boat-wake cluster includes pixels belonging to the object class that are adjacent to each other; associate each of the at least one boat-wake cluster with a subject track of the set of tracks; cluster tracks of the set of tracks that are associated with a common boat-wake cluster; assign each cluster of tracks a unique global track identifier; and select a representative track of each cluster of tracks having a same unique global track identifier; the selected representative track being a first track in a ranked list of tracks, wherein a rank of a track is based on features that are indicative of a real object.

The one or more processors can be further configured to propagate tracks of a set of tracks from one image to the next, wherein each track is possibly an object on a body of water or part of the wake generated by an object on a body of water.

Also, the one or more processors can be further configured to associate new detections to propagated tracks based on bounding box overlap, so that at most one detection is associated to one track, and at most one track is associated to one detection.

Yet another embodiment is a non-transitory computer-readable medium having computer readable program codes embodied thereon for processing a sequence of images, the computer-readable codes including instructions that, when executed by a processor, cause the processor to: identify at least one detection in an image of a series of images, wherein each detection is at least one of: an object on a body of water or at least a portion of a wake generated by the object on the body of water; associate the at least one detection with a single track of a set of tracks, the set of tracks being stored in a memory; create at least one new track for each of the at least one detection that does not associate with any track of the set of tracks; classify each pixel in the image of the series of images as either an object class or a water class based on a range of pixel values; for each pixel classified as an object class, group each pixel in the image of the series of images into at least one boat-wake cluster, wherein each boat-wake cluster includes pixels belonging to the object class that are adjacent to each other; associate each of the at least one boat-wake cluster with a subject track of the set of tracks; cluster tracks of the set of tracks that are associated with a common boat-wake cluster; assign each cluster of tracks a unique global track identifier; and select a representative track of each cluster of tracks having a same unique global track identifier; the selected representative track being a first track in a ranked list of tracks, wherein a rank of a track is based on features that are indicative of a real object.

The non-transitory computer-readable medium can further include computer-readable codes including instructions that, when executed by a processor, cause the processor to propagate tracks of a set of tracks from one image to the next, wherein each track is possibly an object on a body of water or part of the wake generated by an object on a body of water.

In addition, the non-transitory computer-readable medium can include computer-readable codes including instructions that, when executed by a processor, cause the processor to associate new detections to propagated tracks based on bounding box overlap, so that at most one detection is associated to one track, and at most one track is associated to one detection.

BRIEF DESCRIPTION OF THE DRAWINGS

The foregoing will be apparent from the following more particular description of example embodiments of the present disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

A description of example embodiments of the present disclosure follows.

Airborne tracking systems use sensors (e.g., optical sensors) to track objects of interest. In order to track the objects of interest, the sensors need to be steered such that the object is kept, ideally, in the center of the sensors field of view. Automatic steering of optical sensors requires the generation of a track on an object of interest. A track is a reference in a sequence of images that indicates the location of the object in each image. A track is given by the top and bottom rows and the left and right columns of a bounding box that contains the object in each particular image. A steering algorithm continuously steers the sensor so that the object is kept in the center of the field of view. The success of the steering operation depends on the ability of the algorithm to maintain a track on the object of interest. If the track that indicates the location of the object is wrong, the sensor is aimed at a wrong part of the scene and the object is eventually lost because it leaves the field of view of the sensor.

When tracking boats on the water, current approaches to image processing may generate multiple detections on the object of interest. This is caused by the presence of whitecaps and wakes, and the continuous changes in the appearance of the object of interest due to the wake and splashing produced by the motion of the object of interest. This can induce false detections, resulting in multiple tracks, which in reality are associated with the same object of interest. This negatively impacts the performance of the automatically steering system. In particular, track multiplicity affects the steering of the sensors because the tracking system cannot be steered to multiple tracks simultaneously. This often leads the tracking system to lose a correct reference to the object of interest.

Figure 1:
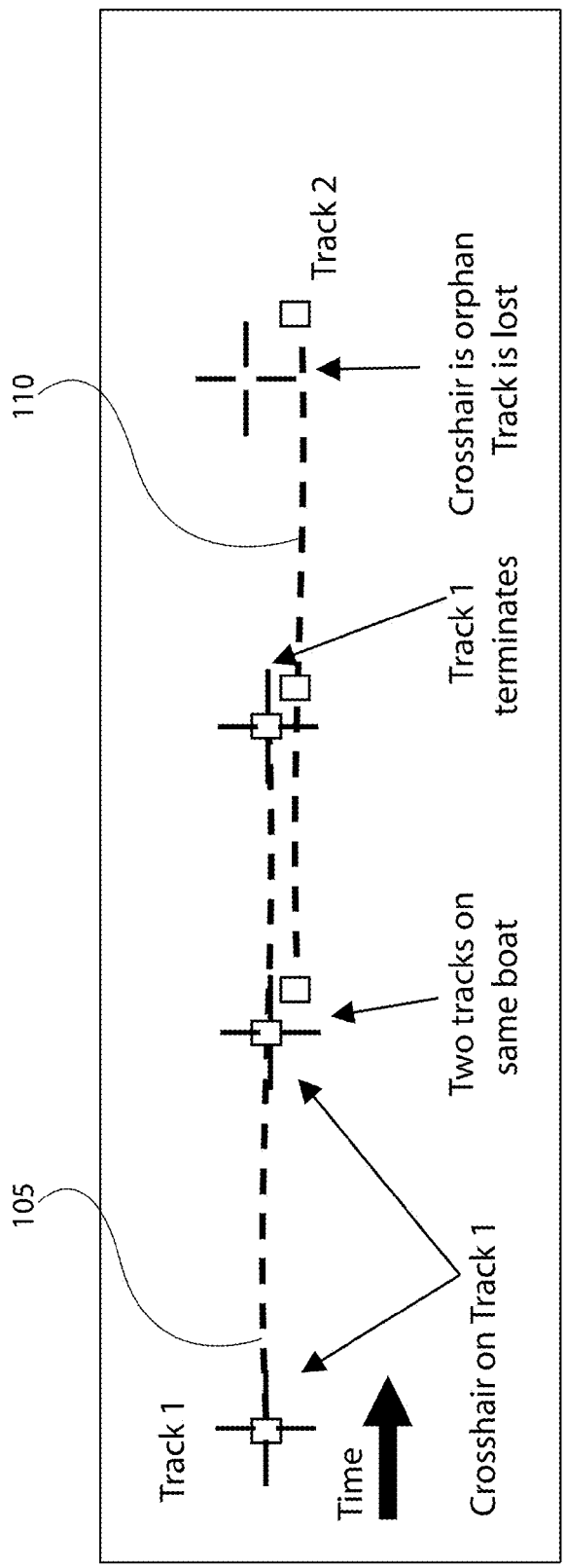
FIG. 1 is a plot of tracks that illustrates how track multiplicity affects the steering of a sensor.

FIG. 1 is a plot of tracks that illustrates how track multiplicity affects the steering of a sensor(s). In this example, the tracking system has initiated a first track 105, Track 1, on an object of interest based on processing of a first image frame. In a subsequent image frame, the tracking system has generated a second track 110, Track 2, which the system believes to be a distinct object; however, in reality, both the first track 105 and the second track 110 are associated with the same object.

When more than one track compete for the same detections, these detections are associated to one of the tracks based on a proximity score. In this example, the new detection is associated to Track 2 110. Since there is a single detection in that particular image, no detections are associated with Track 1 105. Thus the tracking system assumes that the object that has been tracked by Track 1 105 has left the scene, and Track 1 105 is terminated. When this happens, the steering algorithm loses the reference to the object because Track 1 105 no longer exists, and the tracking system does not recognize that Track 2 110 is a track on the same object. An operator eventually needs to reacquire the object of interest by manually steering the sensor to cover the object and associate a new track that corresponds to the object of interest.

Embodiments of the present disclosure solve the track multiplicity problem by grouping tracks associated with the object of interest into a cluster and by estimating a most likely location of the object within the cluster of tracks. Based on the estimated location, embodiments of the present disclosure outputs a single track for the object. The single track is used by an automatic steering system to maintain the sensor aimed at the object of interest.

Figure 2:
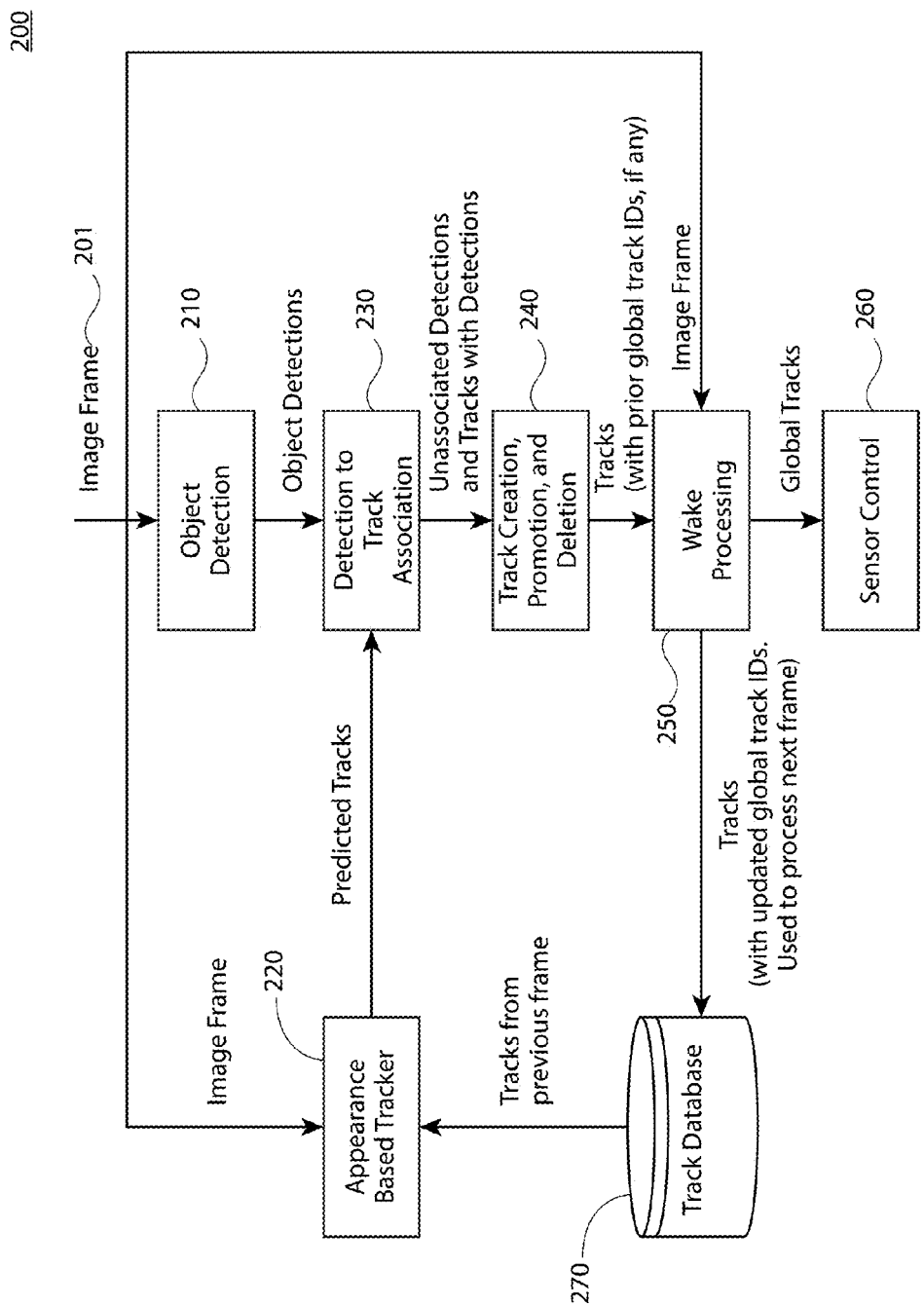
FIG. 2 is a functional block diagram of a system for processing images, in accordance with an example embodiment of the present disclosure.

FIG. 2 is a functional block diagram of a system 200 for processing images, in accordance with an example embodiment of the present disclosure. Elements/modules of the system 200 can be, for example, performed by at least one processor (e.g., processor 704 of FIG. 7). The system 200 receives an image frame 201. The image frame 201 is an image of a scene. In an example, the scene can include object(s) on a body of water. The image frame 201 is received from, for example, an airborne optical sensor aboard an Unmanned Aerial Vehicle or a manned aircraft. The sensor can be an Infra-Red (IR) or Electro-Optical (EO) sensor that collects a video stream of data consisting of a sequence of image frames. The sensor is aimed at a body of water where there are boats or other objects of interests. An object detection module 210, performs object detection on the image frame. In particular, the object detection module 210 processes the image frame 201 and detects objects in the scene included in the image frame. The object(s) in the scene are detected based on characteristics of the object(s) that are distinct from the background. For example, in the scenario where the object(s) is on a body of water, the object(s) has features that are distinct from the body of water (e.g., an intensity of the pixels that belong to the boat is higher than the intensity of the pixels that belong to the water).

The object detection module 210 can utilize any known or yet to be known method to detect objects in the image frame. For example, the object detection module 210 can utilize algorithms that identify objects based on contrast of pixel intensity. Such algorithms identify objects in a scene by assuming that objects appear either brighter or darker than the background (e.g., the body of water). Other algorithms identify objects based on structural characteristics of objects. For instance, edges on objects generally have more diversity than, for example, wakes or whitecaps on a body of water (i.e., the background). These algorithms process the images to extract the magnitude and orientation values for each pixel and compute a score for each pixel based on the orientation of the neighboring pixels. Higher scores are an indication that the region surrounding a pixel contains edges with multiple orientations, which is usually an indicator of the presence of a man-made object, and a detection is generated.

After an object has been detected and a track is initiated, an appearance based tracker 220 performs appearance based tracking. Appearance based tracking maintains an image chip or template in memory for each object that has been detected. An image chip is a portion of the original image that contains the pixels that are deemed to belong to the object of interest. A template is a portion of the image that has been processed and contains information about the object of interest. For instance, a template may be the 2-dimensional fourier transform of the edge image, or may be a histogram of the pixel intensity of the image area that is deemed to contain the object of interest.

A track is initiated with the image chip or template that corresponds to a detection that has not been associated by the detection to track association module 230, as explained in the sequel. The tracker 220 then finds the object in the current image frame by correlating the image chip or the template from the previous image frame with the current image frame or a processed version of the current image frame (e.g. a pixel intensity histogram map). The tracker 220 outputs the location of the track in the current frame.

A detection to track association module 230 performs detection to track association. The detection to track association module 230 receives a set of tracks from the appearance based tracker 220 and a set of object detections from the object detection module 210. The detection to track association module 230 loops over all tracks and finds detections whose bounding boxes overlap with that of each track. If more than one detection overlaps with a track, the detection whose size best matches the size of the track is selected. This selection process ensures that at most one detection is associated to a single track, and at most one track is associated to a single detection. At the end of this process there are detections and tracks that are associated to each other, there are tracks that do not associate to any detections, and there are detections that do not associate to any track. The detection to track association module 230 outputs data that includes the unassociated detections and/or the tracks that may or may not include new detections.

A track creation, promotion, and deletion module 240 receives the data that includes the unassociated detections and/or the tracks that may or may not include new detections. The track creation, promotion, and deletion module 240 creates a new tentative track for each unassociated detection. The module 240 maintains a tally of the number of detections that are associated with each track, and uses that number to promote a track's status from 'Tentative' to 'Firm' in some situations. A track having a status of 'Firm' signifies that the track has a high probability of being generated by a real object. Conversely, a status of 'Tentative' indicates that there is a higher level of uncertainty as to whether the track is being generated by a real object or is the result of spurious detections. If the number of detections associated with a track exceeds a predetermined threshold, the module 240 assumes that the track is generated by a real object and not by false object detections. The module 240 can make such an assumption because real objects induce detections consistently, while false detections induced by white caps, wakes, and illumination artifacts are short lived and disappear over time. The module 240 deletes a track if, over a threshold period of time, there are no object detections that are associated with the track.

The module 240 outputs all tracks, both 'Tentative' and 'Firm', and may include multiple tracks on the same object. Some tracks may be generated by multiple parts of the boat such as the front or the back end, the cockpit, or any other part that presents distinctive features such as strong edges. Other tracks may be tracking parts of the wake. The wake processing module 250 is in charge of identifying the tracks that belong to the same object so that only one track per object is reported.

The wake processing module 250 receives the tracks from the track creation, promotion, and deletion module 240 and the image frame. The wake processing module 250 processes the tracks to remove track multiplicity. In particular, the wake processing module identifies multiple tracks that are all associated with the same object, and assigns them the same global track ID to indicate that these tracks represent a single object. The wake processing module 250 outputs the global track IDs to a sensor control module 260 and a track database 270.

The sensor control module 260 aims the sensor at the particular track whose global track ID has been selected by an operator. For example, after the embodiments of the present disclosure have generate tracks with global track IDs, the operator can select a particular global track ID to be the object of interest. When a global track ID has been selected, the sensor control module 260 continuously adjusts the sensor angles so that the object of interest is always in the center of the field of view. This enables the system to maintain continuous track of the object.

Figure 3:
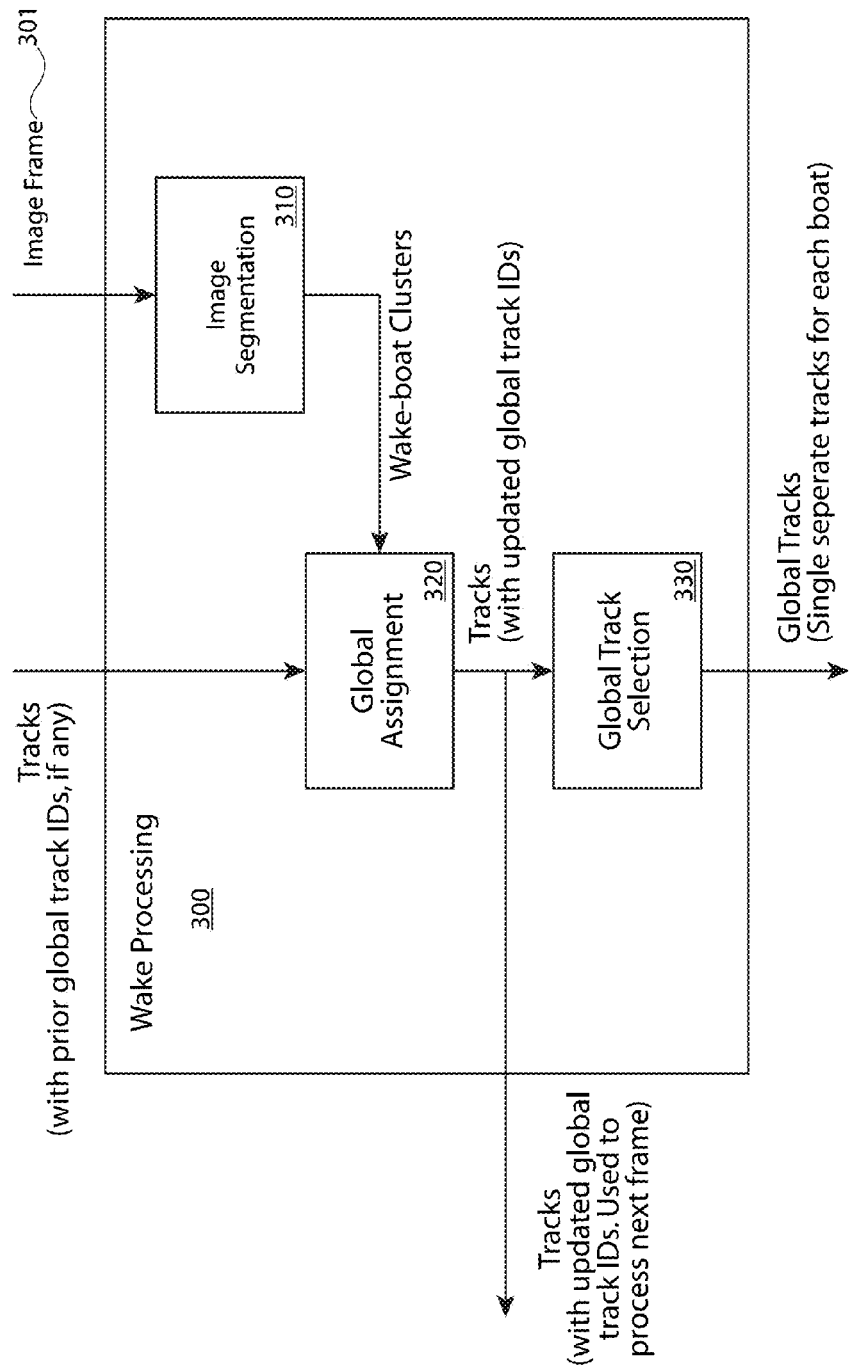
FIG. 3 is a functional block diagram of a wake processing system, in accordance with an example embodiment of the present disclosure.

FIG. 3 is a functional block diagram of a wake processing system 300 (which corresponds to the wake processing module 250 in FIG. 2). The wake processing system 300 includes an image segmentation module 310, a global assignment module 320, and a global track selection module 330. The image segmentation module 310 receives an image frame 301 (e.g., image frame 201 of FIG. 2). In an example, the image frame 301 is received in a format of an N×M matrix of gray level pixel intensities.

The image segmentation module 310 performs any known or yet to be known image processing steps to partition the image into two distinct regions: pixels that belong to the water, and pixels that belong to boats and wakes generated by the boats. In the first step, the image segmentation module 310 performs brightness correction in the current image by fitting low order two-dimensional polynomials to the intensity image, and by subtracting these values from the original image. The image segmentation process then computes image segmentation levels. In particular, the computation yields a range of pixel intensity values that identify a pixel as being part of the background of the scene captured in the image frame 301. For example, in a scene including objects on a body of water, the body of water is considered the background. Thus, any pixel intensity that lies outside the determined range of the background is considered a potential object. Based on the computed image segmentation levels, the image segmentation module 310 performs image segmentation. In other words, the image segmentation module 310 assigns each pixel a label that indicates that the pixel belongs to the water—if the pixel intensity value lies within the determined range—or that the pixel belongs to a boat or a wake generated by the boat, if the pixel intensity value lies outside the determined range.

Figure 4:
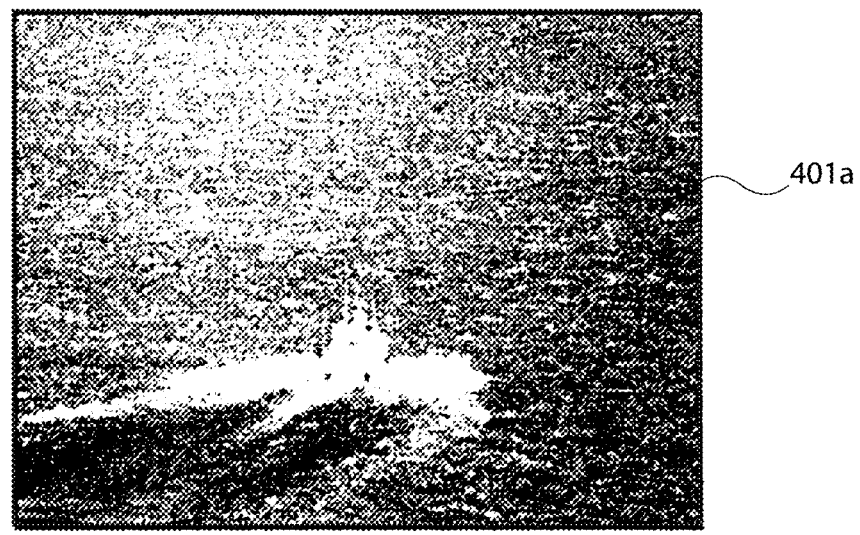
FIG. 4 illustrates an image frame of a scene prior to image segmentation.
Figure 4:

FIG. 4 illustrates an image frame 401*a* of a scene prior to image segmentation. Image frame 401*b* depicts the scene after image segmentation. As can be seen, all pixels that are determined to be part of the background are black, while all pixels considered to be part of an object are white.

Figure 5:
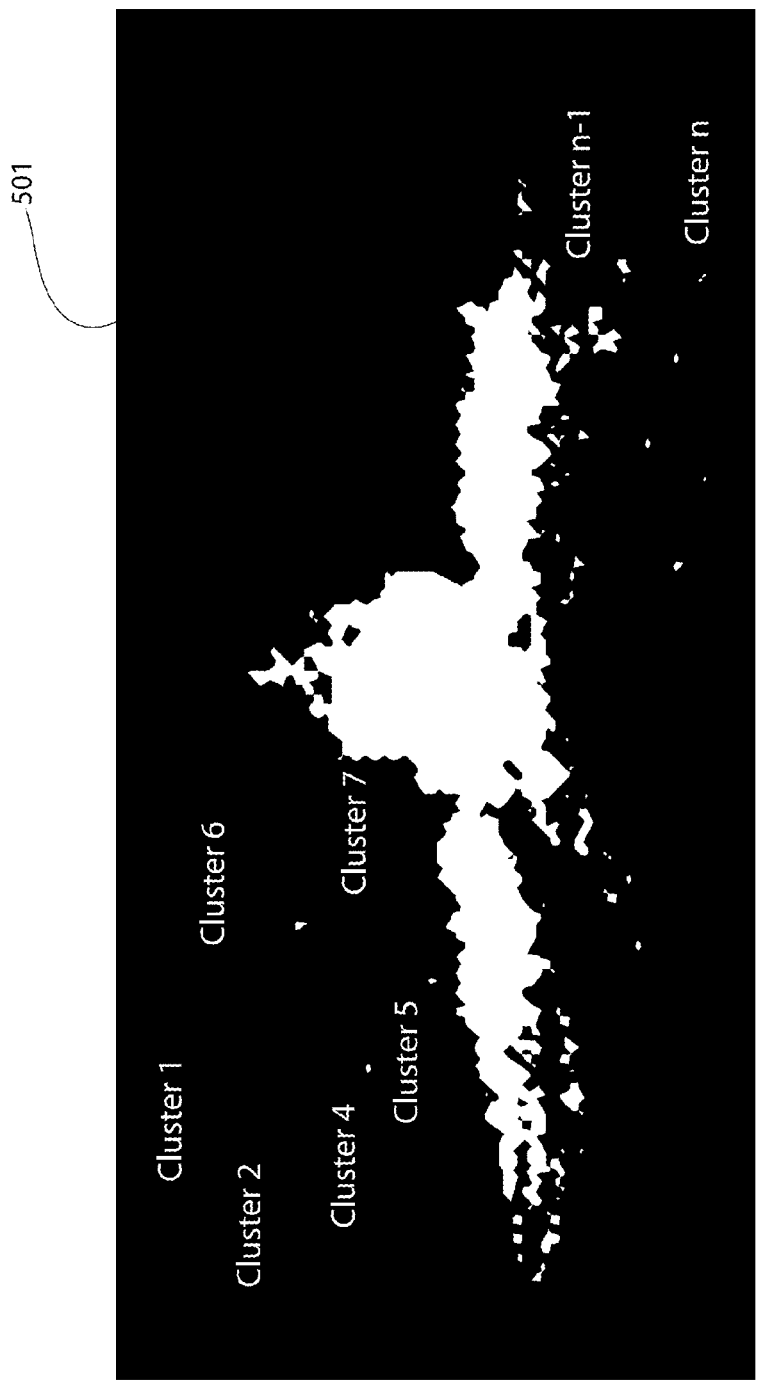
FIG. 5 illustrates an image frame in which the image segmentation module has identified clusters of pixels.

Referring back to FIG. 3, the image segmentation module 310 then applies dilate and erode functions to reduce noise effects in the image frame 301. The image segmentation module 310 can use any known or yet to be known dilate and erode function. The image segmentation module 310 then identifies clusters of pixels that are considered to have a pixel intensity indicative of an object. For example, a cluster of pixels are those pixels that are adjacent to one another and have a pixel intensity value indicative of an object. FIG. 5 illustrates an image frame 501 in which the image segmentation module has identified clusters of pixels. Cluster 7 in this illustration combines boat pixels in the center of the image frame and wake pixels (bottom, left, center, and right). The other clusters are most likely caused by variations in light reflection and whitecaps on the body of water.

The image segmentation module 310 outputs a list of the clusters. Each cluster in the list includes the following information: i) a cluster ID and 2) a list of pixels with, for example, (x,y) position information in image coordinates.

The global assignment module 320 receives the list of clusters from the image segmentation module 310 and a list of tracks, if any exists, with prior global track IDs from the track creation, promotion, and deletion module 240. Each track in the list includes the following information: i) a track IDs, ii) a global track ID, and iii) bounding limits in image coordinates of the object detection associated with the track.

Figure 6:
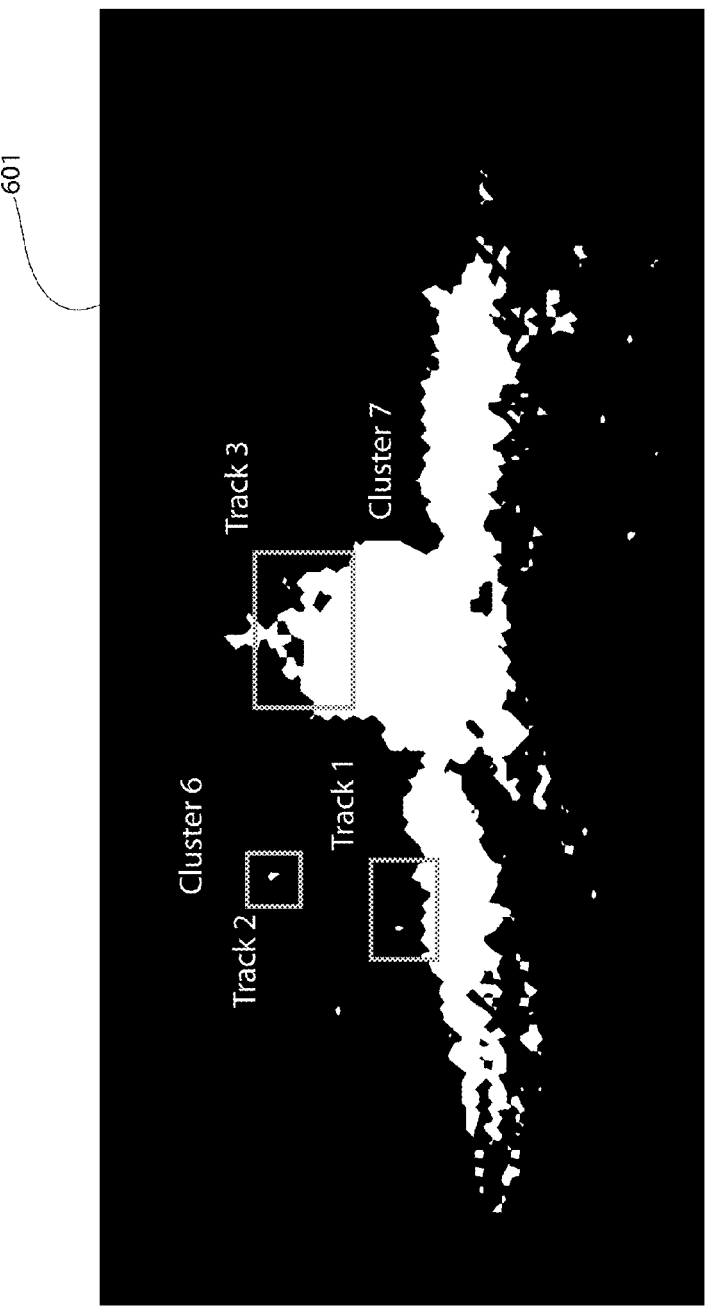
FIG. 6 depicts tracks sharing pixels with a wake-boat cluster, in accordance with an example embodiment of the present disclosure.

In response to receiving said information, the global assignment module 320 computes track-to-track connectivity of the list of tracks. To achieve this, the module loops over all tracks and finds all the wake-boat clusters that share pixels with each track. The global assignment module 320 then finds tracks that mutually share pixels with the same wake-boat cluster. For example, if track 1 shares pixels with wake-boat clusters 5 and 7, and track 3 shares pixels with wake-boat cluster 7, then tracks 1 and 3 are said to be connected to each other (because both share pixels with wake-boat cluster 7). This is illustrated in FIG. 6, where the image frame 601 depicts track 1 and track 3 both sharing pixels with wake-boat cluster 7. Based on such an identification, the global assignment module 320 forms a track cluster that includes track 1 and track 3. Forming a track cluster means that both tracks are assigned a common global track ID. For example, a global track ID of '4' is selected in this example embodiment.

Referring back to FIG. 3, the global assignment module 320 then outputs a list of tracks, each with a newly assigned global track ID, to the global track selection module 330. The global track selection module 330 then loops over all global track IDs and, for each global track ID, selects a single track of the set of tracks associated with each global track ID. The global track selection module 330 assumes that the track that has lived the longest is more likely to be the real object because the false detections are short lived and disappear over time. Thus, out of all the tracks with the same global track ID, the module 330 selects the one with the earliest initiation time, and outputs that track to the sensor control module 260 of FIG. 2. As explained above, the sensor control module 260 aims the sensor at the particular track whose global track ID has been selected by the operator.

Figure 7:
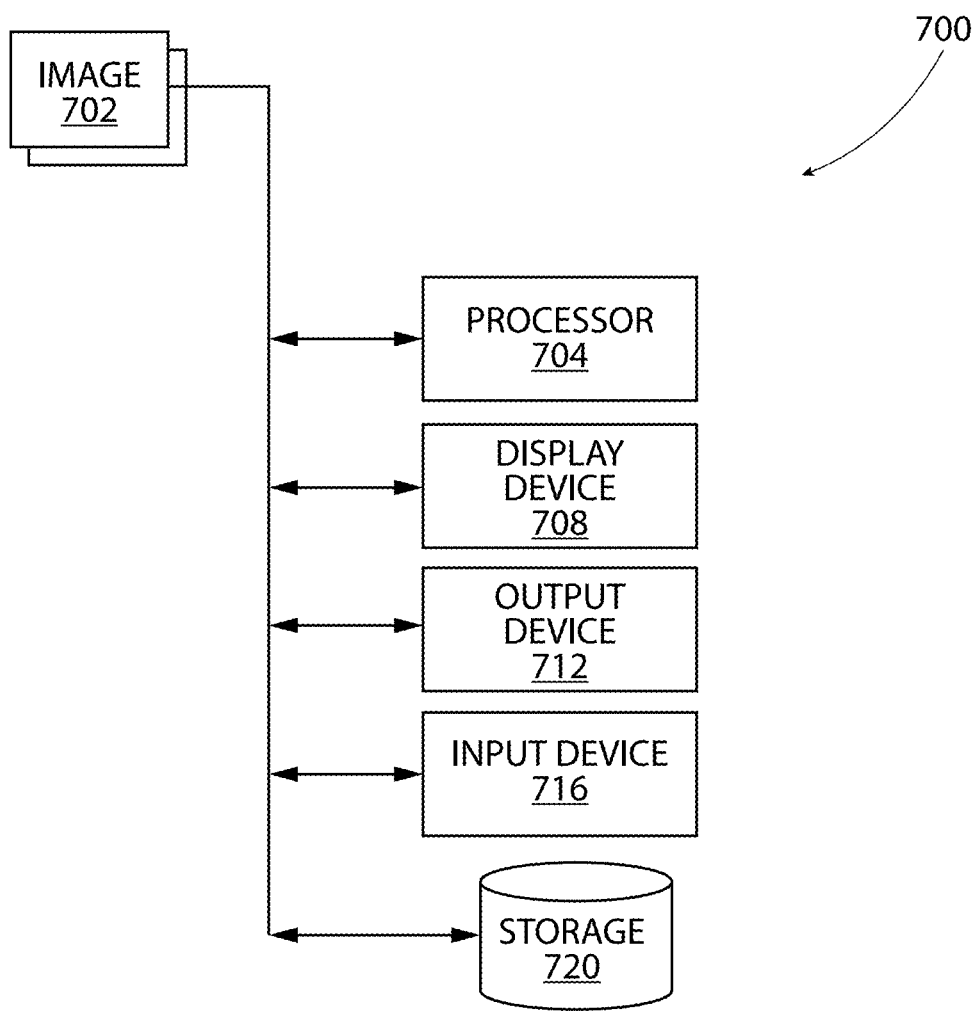
FIG. 7 is a schematic illustration of a system for detecting objects in an image, in accordance with an example embodiment of the present disclosure.

FIG. 7 is a schematic illustration of a system 700 for detecting objects in an image 702, according to an embodiment of the present disclosure. The system 700 includes a processor 704 for processing the image 702. The processor 704 stores a variety of information about the image 702 and the system 700. The storage device 720 can include a plurality of storage devices. The storage device 720 can include, for example, long-term storage (e.g., a hard drive, a tape storage device, flash memory), short-term storage (e.g., a random access memory, a graphics memory), and/or any other type of computer readable storage.

The modules and devices described herein can, for example, utilize the processor 704 to execute computer executable instructions and/or include a processor to execute computer executable instructions e.g., an encryption processing unit, a field programmable gate array processing unit). It should be understood that the system 700 can include, for example, other modules, devices, and/or processors known in the art and/or varieties of the illustrated modules, devices, and/or processors.

The input device 716 receives information associated with the system 700 (e.g., instructions from a user, instructions from another computing device) from a user (not shown) and/or another computing system (not shown). The input device 716 can include, for example, a keyboard, scanner or mouse. The output device 712 outputs information associated with the system 700 (e.g., information to a printer not shown), information to an audio speaker (not shown)).

The optional display device 708 displays information associated with the system 700 (e.g., status information, configuration information). The processor 704 executes the operating system and/or any other computer executable instructions for the system 700 (e.g., processes the image 702 to detect objects in the image 702).

Figure 8:
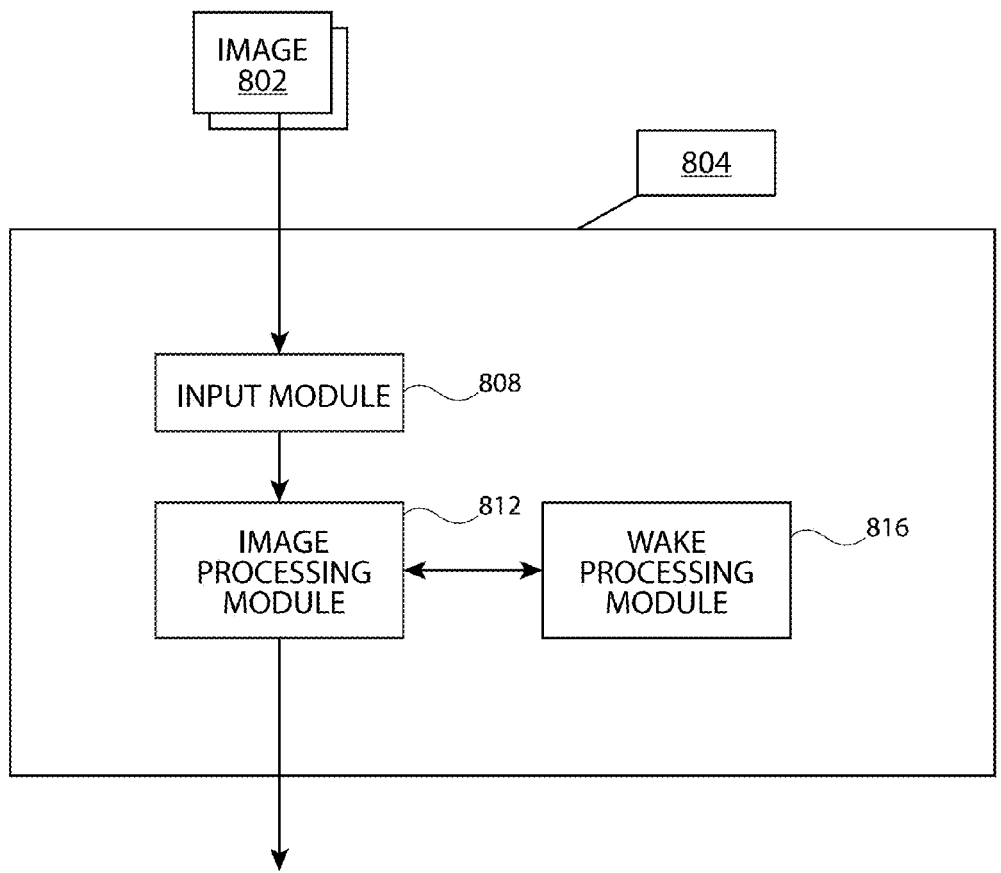
FIG. 8 is a schematic illustration of exemplary modules implemented in a processor according to an embodiment.

FIG. 8 is a schematic illustration of exemplary modules implemented in a processor 804, according to an embodiment. In one embodiment, the processor 804 is used as the processor 704 of FIG. 7 to implement the methods of FIGS. 2 and 3. The processor 804 includes an input module 808, an image processing module 812, and a wake processing module 816. The input module 808 receives magnitude and orientation values for each pixel in an image 802 and provides the values to the image processing module 812. The image processing module 812 performs, for example, steps of FIG. 2. The wake processing module 816 performs, for example, steps of FIG. 3.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be an FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include (and can be operatively coupled to receive data from and/or transfer data to) one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry® device or Apple® iPad device.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The teachings of all patents, published applications and references cited herein are incorporated by reference in their entirety.

While the present disclosure has been particularly shown and described with references to example embodiments thereof, it will be understood by those skilled in the art that various changes in form and details may be made therein without departing from the scope of the present disclosure encompassed by the appended claims.

What is claimed is:

1. A method, executed by one or more processors, for processing a sequence of images to identify, track, and/or target an object on a body of water, the method comprising:
   identifying at least one detection in an image of a series of images, wherein each detection is at least one of: an object on a body of water or at least a portion of a wake generated by the object on the body of water;
   associating the at least one detection with a single track of a set of tracks, the set of tracks being stored in a memory;
   creating at least one new track for each of the at least one detection that does not associate with any track of the set of tracks;

classifying each pixel in the image of the series of images as either an object class or a water class based on a range of pixel values;

for each pixel classified as an object class, grouping each pixel in the image of the series of images into at least one boat-wake cluster, wherein each boat-wake cluster includes pixels belonging to the object class that are adjacent to each other;

associating each of the at least one boat-wake cluster with a subject track of the set of tracks;

clustering tracks of the set of tracks that are associated with a common boat-wake cluster;

assigning each cluster of tracks a unique global track identifier; and selecting a representative track of each cluster of tracks having a same unique global track identifier; the selected representative track being a first track in a ranked list of tracks, wherein a rank of a track is based on features that are indicative of a real object.

2. The method of claim 1 further comprising:
propagating tracks of a set of tracks from one image to the next, wherein each track is possibly an object on a body of water or part of the wake generated by an object on a body of water.

3. The method of claim 1 wherein associating the at least one detection with a single track of a set of tracks includes associating new detections to propagated tracks based on bounding box overlap, so that at most one detection is associated to one track, and at most one track is associated to one detection.

4. The method of claim 3, wherein a bounding box is a reference to the at least one detection, the bounding box being defined by top and bottom rows and left and right columns of a region that contains at least all pixels that are deemed to belong to the at least one detection.

5. A system for processing a sequence of images to identify, track, and/or target an object on a body of water, the system comprising:
one or more processors in communication with a data storage device, the one or more processors configured to:
identify at least one detection in an image of a series of images, wherein each detection is at least one of: an object on a body of water or at least a portion of a wake generated by the object on the body of water;
associate the at least one detection with a single track of a set of tracks, the set of tracks being stored in a memory;
create at least one new track for each of the at least one detection that does not associate with any track of the set of tracks;
classify each pixel in the image of the series of images as either an object class or a water class based on a range of pixel values;
for each pixel classified as an object class, group each pixel in the image of the series of images into at least one boat-wake cluster, wherein each boat-wake cluster includes pixels belonging to the object class that are adjacent to each other;
associate each of the at least one boat-wake cluster with a subject track of the set of tracks;
cluster tracks of the set of tracks that are associated with a common boat-wake cluster;
assign each cluster of tracks a unique global track identifier; and
select a representative track of each cluster of tracks having a same unique global track identifier, the selected representative track being a first track in a ranked list of tracks, wherein a rank of a track is based on features that are indicative of a real object.

6. The system of claim 5 wherein the one or more processors are further configured to:
propagate tracks of a set of tracks from one image to the next, wherein each track is possibly an object on a body of water or part of the wake generated by an object on a body of water.

7. The system of claim 5 wherein the one or more processors are further configured to associate new detections to propagated tracks based on bounding box overlap, so that at most one detection is associated to one track, and at most one track is associated to one detection.

8. The system of claim 7, wherein a bounding box is a reference to the at least one detection, the bounding box being defined by top and bottom rows and left and right columns of a region that contains at least all pixels that are deemed to belong to the at least one detection.

9. A non-transitory computer-readable medium having computer readable program codes embodied thereon for processing a sequence of images to identify, track, and/or target an object on a body of water, the computer-readable codes including instructions that, when executed by a processor, cause the processor to:
identify at least one detection in an image of a series of images, wherein each detection is at least one of: an object on a body of water or at least a portion of a wake generated by the object on the body of water;
associate the at least one detection with a single track of a set of tracks, the set of tracks being stored in a memory;
create at least one new track for each of the at least one detection that does not associate with any track of the set of tracks;
classify each pixel in the image of the series of images as either an object class or a water class based on a range of pixel values;
for each pixel classified as an object class, group each pixel in the image of the series of images into at least one boat-wake cluster, wherein each boat-wake cluster includes pixels belonging to the object class that are adjacent to each other;
associate each of the at least one boat-wake cluster with a subject track of the set of tracks;
cluster tracks of the set of tracks that are associated with a common boat-wake cluster;
assign each cluster of tracks a unique global track identifier; and
select a representative track of each cluster of tracks having a same unique global track identifier; the selected representative track being a first track in a ranked list of tracks, wherein a rank of a track is based on features that are indicative of a real object.

10. The non-transitory computer-readable medium of claim 9 further including computer-readable codes including instructions that, when executed by a processor, cause the processor to:
propagate tracks of a set of tracks from one image to the next, wherein each track is possibly an object on a body of water or part of the wake generated by an object on a body of water.

11. The non-transitory computer-readable medium of claim 9 further including computer-readable codes including instructions that, when executed by a processor, cause the processor to:

associate new detections to propagated tracks based on bounding box overlap, so that at most one detection is associated to one track, and at most one track is associated to one detection.

12. The non-transitory computer-readable medium of claim 11, wherein a bounding box is a reference to the at least one detection, the bounding box being defined by top and bottom rows and left and right columns of a region that contains at least all pixels that are deemed to belong to the at least one detection.

* * * * *